(12) United States Patent
Lai

(10) Patent No.: US 6,209,975 B1
(45) Date of Patent: Apr. 3, 2001

(54) RETAINING DEVICE FOR A FRONT COVER OF A COMPUTER CASING

(76) Inventor: Vincent Lai, No. 57, Lane 350, Nanshang Road, Gucisham Hsiang, Taoyuan Hsien (TW)

( * ) Notice: Subject to any disclaimer, the term of this patent is extended or adjusted under 35 U.S.C. 154(b) by 0 days.

(21) Appl. No.: 09/618,385

(22) Filed: Jul. 18, 2000

(51) Int. Cl.[7] ............................................. A47B 97/00

(52) U.S. Cl. .............................. 312/223.2; 312/265.6; 361/724; 292/81; 292/83

(58) Field of Search ................................ 312/223.1, 223.2, 312/265.5, 265.6, 215, 218, 222; 361/724, 725, 726, 683; 292/332, 336, 253, 254, 80, 81, DIG. 72, 83

(56) References Cited

U.S. PATENT DOCUMENTS

| 687,922 | * | 12/1901 | Kaye ..................................... 292/254 |
| 2,896,988 | * | 7/1959 | Hitzelberger ........................... 292/83 |
| 5,116,261 | * | 5/1992 | Lan et al. .......................... 361/685 X |
| 5,825,626 | * | 10/1998 | Hulick et al. .................. 312/223.2 X |

* cited by examiner

Primary Examiner—James O. Hansen
(74) Attorney, Agent, or Firm—Pro-Techtor International Services

(57) ABSTRACT

A retaining device for a front cover of a computer casing has at least two arms extending out from a back face of the front cover, a shaft pivotally received in the computer casing and having at least two pushes each detachably connected to a corresponding one of the arms and a knob securely formed on the distal end of the shaft. With such an arrangement, the user is able to easily detach the front cover from the computer casing.

3 Claims, 6 Drawing Sheets

RETAINING DEVICE FOR A FRONT COVER OF A COMPUTER CASING

BACKGROUND OF THE INVENTION

1. Field of the Invention

The present invention relates to a retaining device of a computer casing, and more particularly to a retaining device for a front cover of a computer casing. The retaining device has a knob securely provided to a distal end of a shaft that is rotatably mounted on a top cover of the computer casing and has at least a retainer securely mounted thereon. The front cover has at least an arm extending out from an edge thereof and each having a retaining hole defined to correspond to the retainer. Thus, the front cover is detachably connected to the casing.

2. Prior Art Description

A conventional front cover of a computer casing normally is screwed onto the casing. When necessary, the user will have to use a screw driver to unscrew the front cover from the casing, which is time consuming and labor inefficient. To overcome the drawback, a snapping hook is provided to the front cover, which is corresponding to the hole defined in the casing, such that when necessary, the user can detach the front cover from the casing easily by separate the engagement between the snapping hook and the hole. However, separating the front cover from the casing by detach the engagement between the snapping hook and the hole often causes damage to the snapping hook and even break to the snapping hook, which bothers the user a lot To overcome the shortcomings of the above mentioned problems, the present invention provides an improved retaining device mounted respectively on a top face of the casing and the front cover, such that the user is able to detach the engagement between the front cover and the casing easily.

SUMMARY OF THE INVENTION

The primary objective of the invention is to provide an improved retaining device having a knob pivotally mounted on a top cover of the computer casing to control the engagement between an arm extending out from a front cover and a retainer securely rested on the shaft, such that the front cover is able to detach from the computer casing by pivoting the knob.

Other objects, advantages and novel features of the invention will become more apparent from the following detailed description when taken in conjunction with the accompanying drawings.

DETAILED DESCRIPTION TO THE PREFERRED EMBODIMENT

Figure 1:
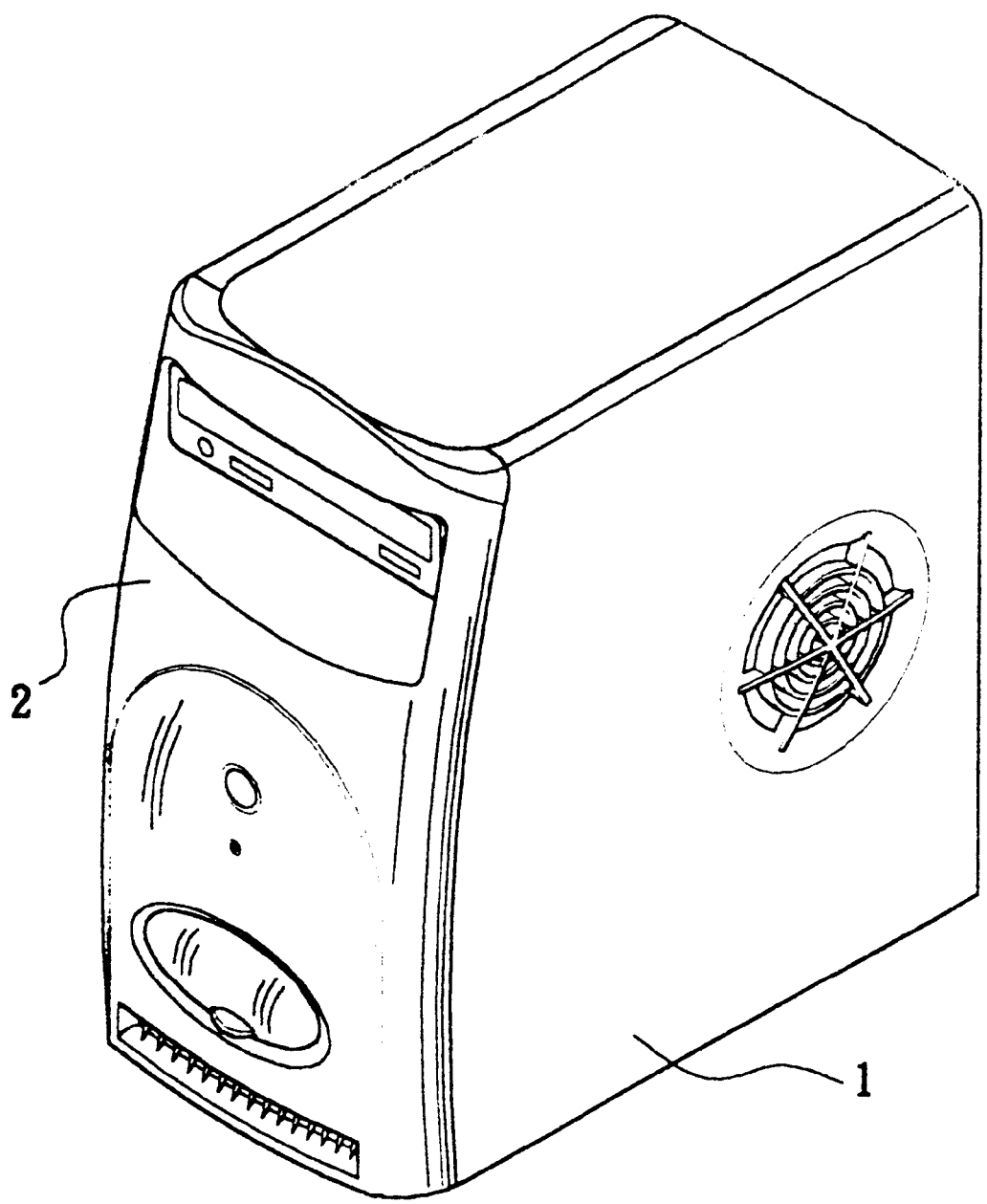
FIG. 1 is a perspective view of the computer casing constructed in accordance with the present invention.
Figure 2:
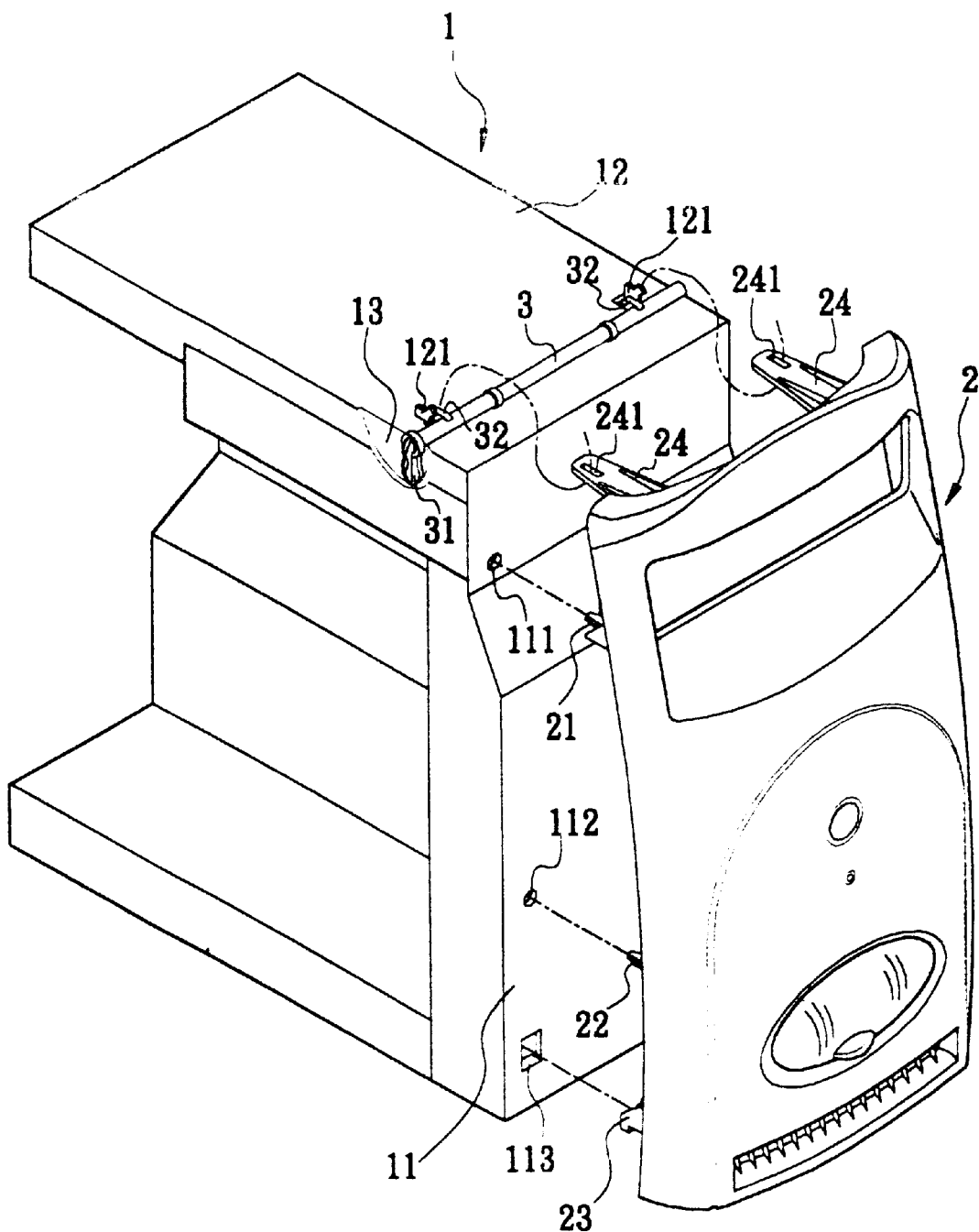
FIG. 2 is an exploded perspective view of the parts of a retaining device respectively mounted on the front cover and the computer casing.
Figure 3:
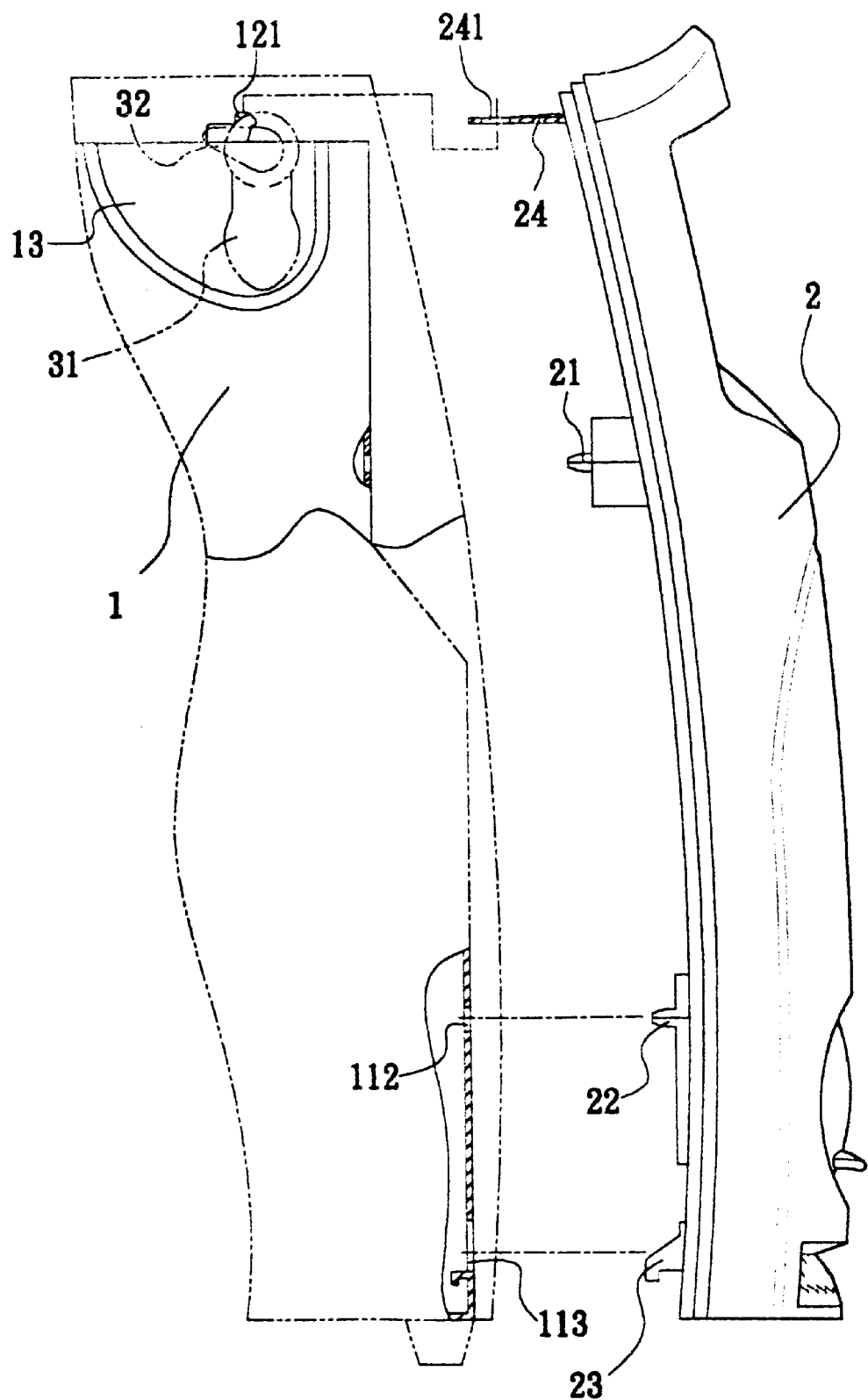
FIG. 3 is a side view showing the front cover and the computer casing, wherein a knob is provided to a side of the casing and an arm is provided to the front cover.

With reference to FIG. 1, a computer casing (1) having a front cover (2) constructed in accordance with the present invention is shown. The front cover (2) is detachably connected to the computer casing (1) by means of a retaining device. With reference to FIGS. 2 and 3, the retaining device has a shaft (3) pivotally mounted on a top cover (12) of the casing (1) and having a knob (31) securely mounted to a distal end thereof and a push (32) integrally formed thereon, at least two arms (24) extending out from a back face of the front cover (2) and each having a securing hole (241) defined to correspond to a hook (121) securely mounted on the top cover (12), at least three pairs of extensions (21,22,23) integrally formed on the back face of the front cover (2) to correspond to at least three pairs of holes (111,112,113) in a face of the casing (1).

Figure 4:
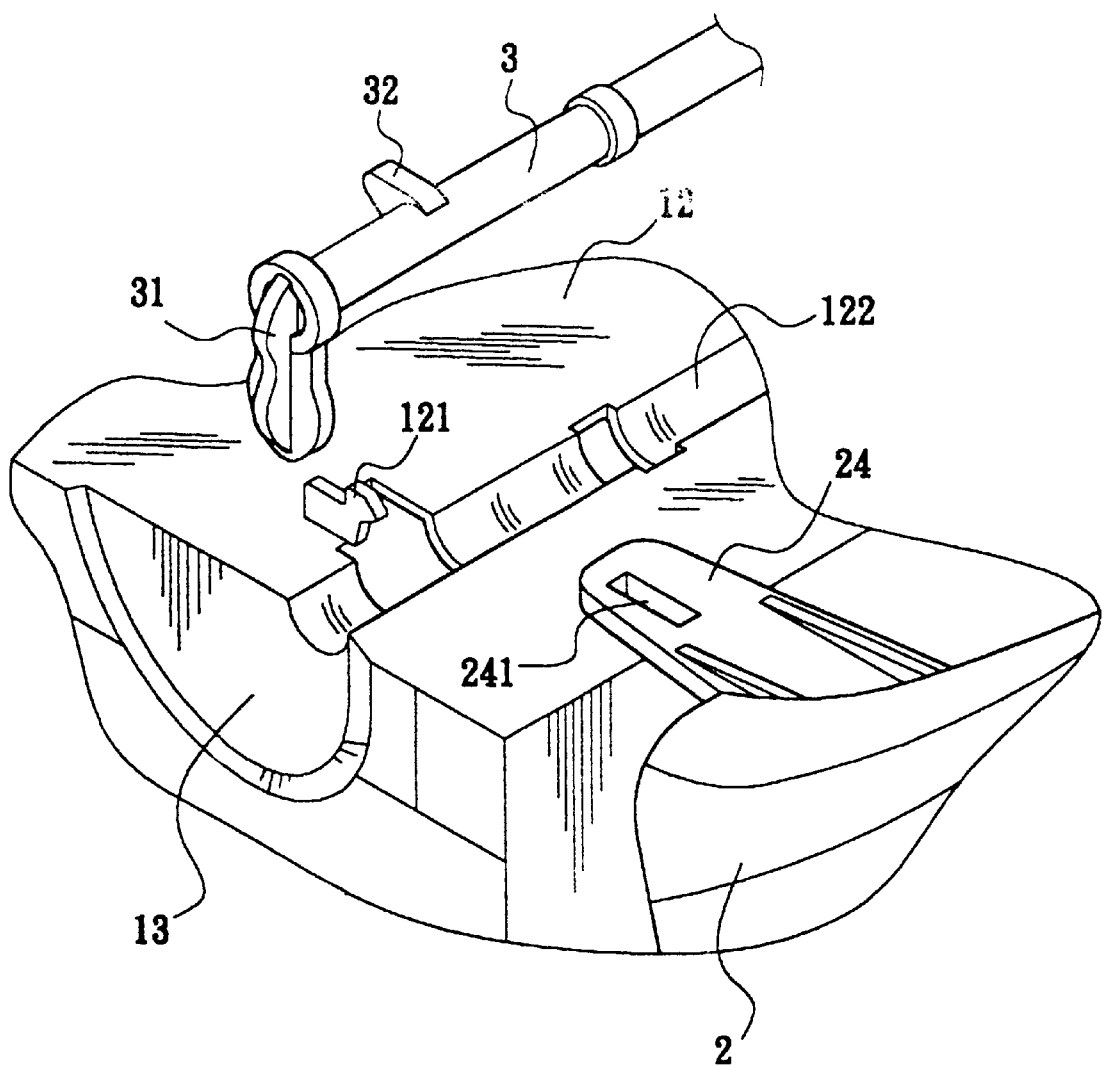
FIG. 4 is an enlarged exploded perspective view showing the knob connected with a shaft and the configuration on the front cover.
Figure 5:
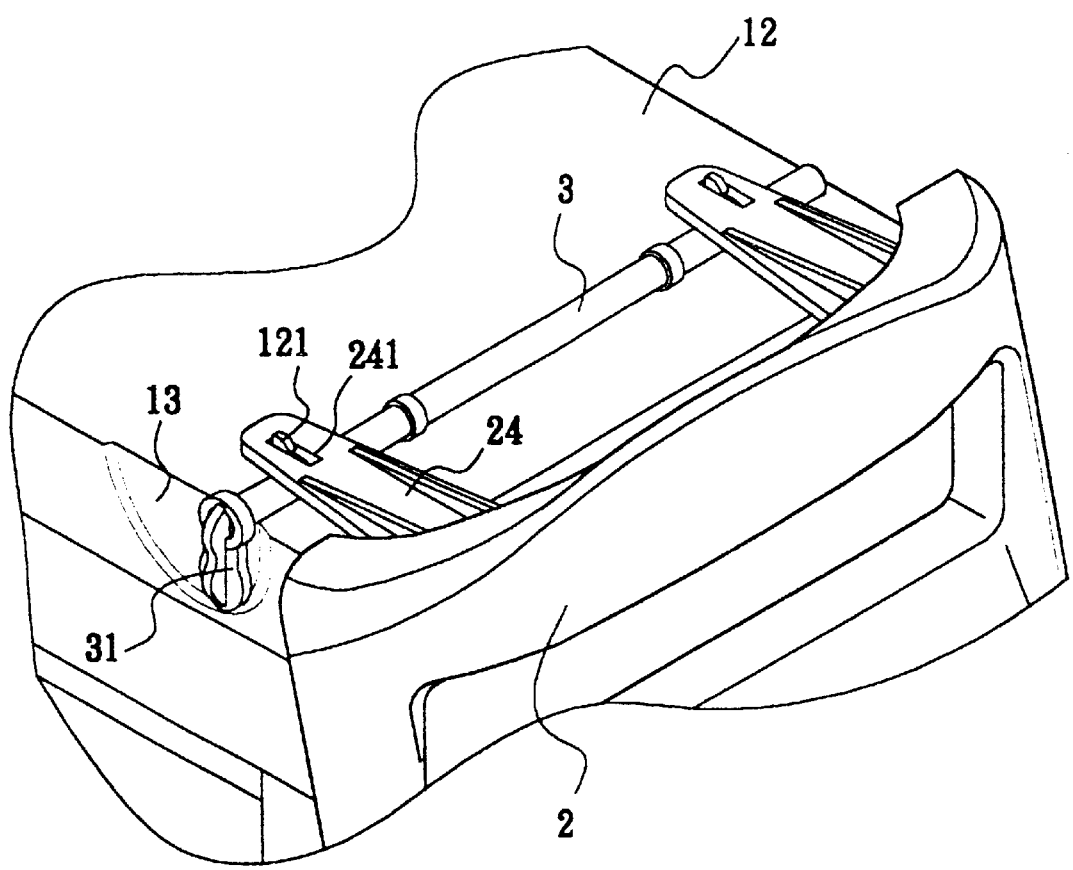
FIG. 5 is an enlarged perspective view showing the engagement between the arm and the shaft.
Figure 6:
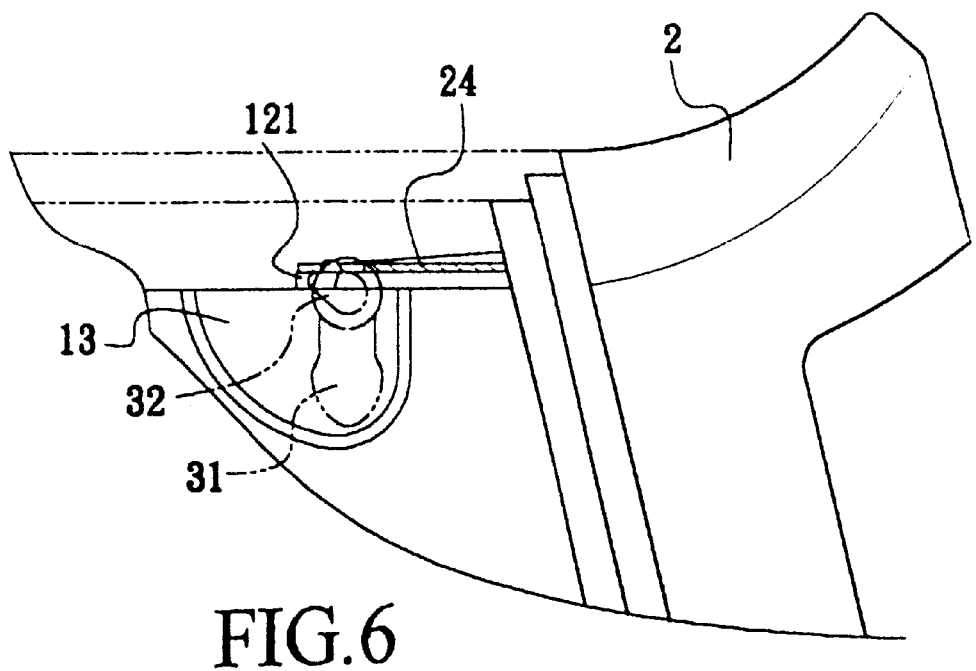
FIGS. 6 and 7 are schematic side views showing the pivotal movement of the knob causes the engagement/detachment of the arm to the computer casing.
Figure 7:
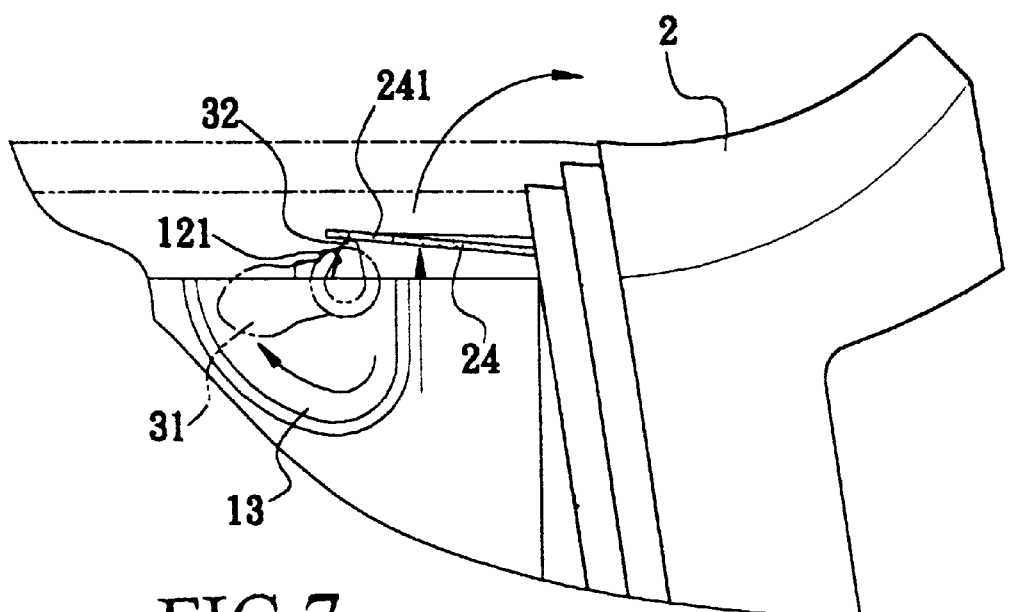

Referring to FIG. 4, the top cover (12) of the computer casing (1) has a recess (122) defined to pivotally receive the shaft (3) therein and a cutout (13) defined in a side face of the casing (1) and adjacent to the top face (12) for pivotally receiving the knob (31) therein. Along the recess (122), at least two hooks (121) are mounted to correspond to the securing holes (241) of the at least two arms (24). When the front cover (2) is to be connected with the computer casing (1), the extensions (21,22,23) are respectively inserted into the corresponding holes (111,112,113) of the casing (1) and each of the hooks (121) are then respectively inserted into the corresponding securing hole (241) of each of the arms (24). Therefore, the front cover (2) is connected with the computer casing (1), as shown in FIG. 5.

When detachment of the front cover (2) with the computer casing (1) is necessary, the user pivots the knob (31) to rotate the shaft (3). At the same time, the push (32) on the shaft (3) will engage the arm (24) and then push away the arm (24) to detach the limitation to the hooks (121) by the securing hole (241). Accordingly, the front cover (2) is detached from the computer casing.

From the above description, it is noted that the retaining device enables the user to detach the front cover (2) easily from the computer casing (1), which saves a lot of time and effort when compared with the conventional manner.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining device in combination with a front cover and a computer casing, the retaining device comprising:

at least two arms extending out from a back face of the front cover and each arm having a securing hole defined in a distal end thereof;

a shaft rotatably received in a top face of the computer casing and having a knob securely attached to a distal end thereof, and shaft having at least two pushes mounted thereon to detachably connect to the respective arms; and at least two hooks are formed on the computer casing to engage the respective securing holes of the arms; wherein the front cover is detached from the computer casing when the shaft is rotated by pivoting the knob, thereby moving the pushes into engagement with the arms such that the arms are displaced enough to detach the hooks from the securing holes.

2. The retaining device as claimed in claim 1, wherein a cutout is defined in a side face of the computer casing to pivotally receive the knob therein.

3. The retaining device as claimed in claim 1, wherein at least three pairs of extensions extend out from the back face of the front cover to correspond to at least three pairs of holes in the computer casing.

* * * * *